United States Patent [19]
Kim et al.

[11] Patent Number: 6,064,454
[45] Date of Patent: May 16, 2000

[54] COLOR FILTER PANEL OF AN LCD DEVICE

[75] Inventors: Jeong Hyun Kim; Jae Yong Park; Woong Kwon Kim, all of Kyunggi-do; Kyoung Nam Lim, Seoul; Sung Il Park, Kyunggi-do, all of Rep. of Korea

[73] Assignee: LG Electronics Inc., Seoul, Rep. of Korea

[21] Appl. No.: 09/359,645

[22] Filed: Jul. 26, 1999

Related U.S. Application Data

[62] Division of application No. 09/085,014, May 28, 1998.

[30] Foreign Application Priority Data

Jul. 14, 1997 [KR] Rep. of Korea ............... P97-32701

[51] Int. Cl.[7] .................. G02F 1/1333; G02F 1/1335
[52] U.S. Cl. ....................... 349/110; 349/106; 349/111
[58] Field of Search ........................... 349/106, 110, 349/111

[56] References Cited

U.S. PATENT DOCUMENTS

| | | | |
|---|---|---|---|
| 4,867,537 | 9/1989 | Aoki et al. | 349/106 |
| 5,367,393 | 11/1994 | Ohara et al. | 349/106 |
| 5,420,708 | 5/1995 | Yokoyama et al. | 359/67 |
| 5,850,271 | 12/1998 | Kim et al. | 349/111 |
| 5,989,757 | 11/1999 | Yokoyama et al. | 359/67 |

FOREIGN PATENT DOCUMENTS

| | | |
|---|---|---|
| 1167823 | 7/1989 | Japan . |
| 6034999 | 2/1994 | Japan . |

*Primary Examiner*—William L. Sikes
*Assistant Examiner*—Tarifur R. Chowdhury

[57] ABSTRACT

A device and method for manufacturing a high aperture ratio color filter panel of a liquid crystal display by reducing the resistance of the common electrode is disclosed. The method includes the steps of forming a black matrix array on a substrate, the black matrix array including a plurality of horizontal black matrix strips and a plurality of vertical black matrix strips, forming a plurality of color filters on the substrate, and the horizontal black matrix strips, so that portions of the horizontal black matrix strips are exposed, and forming a common electrode over the color filters.

5 Claims, 11 Drawing Sheets

COLOR FILTER PANEL OF AN LCD DEVICE

This application is a divisional of co-pending application Ser. No. 09/085,014, filed on May 28, 1998, the entire contents of which are hereby incorporated by reference.

BACKGROUND OF THE INVENTION

1. Field of the Invention

The present invention relates to an active matrix liquid crystal display (AMLCD) device including thin film transistors (TFTs) and pixel electrodes arranged in a matrix pattern in an active panel, and a method of manufacturing the same. More particularly, the present invention relates to a method of manufacturing a color filter panel with high aperture ratio usable in an AMLCD device, and the structure formed by the method.

2. Description of the Background Art

Among many display devices showing visual images on a screen, thin film type flat panel display devices are highly favored due to their lightweight and easy adaptability. Research activities have been focused actively on the development of such liquid crystal display devices because of their high resolution and fast response time suitable for displaying motion picture images.

A liquid crystal display (LCD) device operates through polarization and optical anisotropy of a liquid crystal. By controlling the orientation of liquid crystal molecules having rod shapes using a polarization technique, transmission and interception of a light through the liquid crystal layer are achieved due to the anisotropy of the liquid crystal. This principle is applied to conventional LCD devices.

Conventional LCD devices having TFTs arranged in a matrix pattern and pixel electrodes connected to the TFTs provide high quality images and are now widely used. The structure of a conventional AMLCD will now be described, referring to FIG. 1.

As shown in FIG. 1, a conventional liquid crystal display (LCD) 10 includes two panels which are joined by a liquid crystal layer therebetween. One panel of the LCD includes elements for reproducing color and is called a "color filter panel." The color filter panel of the conventional LCD includes a sequential arrangement of red (R), green (G) and blue (B) color filters 3R, 3G and 3B formed on a transparent substrate 1a in a matrix pattern. Between the color filters 3R, 3G and 3B, a black matrix 5 is formed in a lattice pattern. The black matrix 5 prevents mixing of the colors at the boundary areas. On the color filters 3R, 3G and 3B, a common electrode 7 is formed. The common electrode 7 is one of the two electrodes used to generate an electric field across the liquid crystal layer when operating the LCD device.

The other panel of the conventional LCD includes switching elements and bus lines for generating the electric field to activate the liquid crystal and is called an "active panel". The active panel of the conventional LCD includes pixel electrodes 11 arranged in a matrix pattern and formed on a transparent substrate 1b. Along the horizontal direction of the pixel electrodes 11, signal bus lines (gate lines) 13 extend with a predetermined distance therebetween. Along the vertical direction of the pixel electrodes 1, data bus lines (source lines) 15 extend with a predetermined distance therebetween. At one corner of each pixel electrode 11, a TFT 17 for driving the corresponding pixel electrode 11 is formed. Each TFT 17 includes a gate electrode 23, a source electrode 25, and a drain electrode 27. The gate electrode 23 of the TFT 17 is connected with the corresponding signal bus line 13. The source electrode 25 of the TFT 17 is connected with the data bus line 15. The drain electrode 27 of the TFT is connected to the corresponding pixel electrode 11. Additionally, pads as the terminals of the bus lines are formed at the end portion of each bus line.

The color filter panel and the active panel are bonded together to face each other with a certain distance therebetween (i.e., with a certain cell gap). A liquid crystal material fills the cell gap to complete the formation of the liquid crystal panel of the LCD.

The above conventional LCD reproduces a picture image in accordance with an electrical signal received from a video processor. FIG. 2a shows a schematic circuit diagram of the LCD of FIG. 1 and FIG. 2b shows a schematic circuit diagram of a pixel part of the LCD of FIG. 1. Using FIGS. 2a and 2b, the working principle of the conventional LCD will be explained hereinbelow.

Referring to FIGS. 2a and 2b, a signal voltage is selectively applied to the gate lines 13 arrayed in a vertical direction The signal voltage is applied to the first one of the gate lines 13 at first, then to the second one of the gate lines 13, then to the third one of the gate lines 13, and so on. That is, the signal voltage is sequentially applied to the N gate lines. The signal voltage is a pulse type waveform having a voltage of 2–5 volts with the applying time of 60–70 μsec. When the signal voltage is applied to a certain gate line 13, the gate electrodes 23 connected to that gate line 13 are applied with a scan voltage and the TFTs 17 connected to the same gate line 13 are turned on.

During the ON-state of the TFTs 17, electrical picture data from the corresponding source line 15 is transmitted from the source electrodes 25 to the drain electrodes 27 of the TFTs 17. Then the picture data is transmitted to the pixel electrodes 11 connected to the drain electrodes 27. Each signal of the picture data has two possible states, "0" and "1". The "0" state reflects no voltage difference between the corresponding pixel electrode and the common electrode, whereas the "1" state reflects a voltage difference between the corresponding pixel electrode and the common. When there is a voltage difference, a voltage signal, e.g. 2–5 volts, is applied to the liquid crystal. When there is no voltage difference, a voltage signal, e.g. 0–1 volt, is applied to the liquid crystal. As a result, a voltage signal of 2–5 volts ("1" state) or 0–1 volt ("0" state) is applied to the pixel electrodes.

Once the scan voltage is applied to the gate line 13, before another scan voltage can be applied to the gate line 13, the gate line 13 is applied with a zero volt. The TFTs 17 connected to the gate bus line 13 are then in the OFF state. During that period, the stored capacitance at the pixel electrode is isolated and the pixel electrode maintains its present state until the next data signal is input as the next scan signal is applied.

An electrical field is applied to the liquid crystal in accordance with the voltage difference between the pixel electrode 11 and the common electrode 7. As the electrical field is formed, the arrangement direction of the liquid crystal molecules changes. Without the electrical field, the arrangement direction of the liquid crystal molecules is unchanged. Therefore, depending on whether or not the electric field is applied to the liquid crystal, a backlight from the backside of the panel is selectively transmitted through the liquid crystal layer, and a picture is reproduced on the screen of the LCD device. In FIG. 2b, the capacitance $C_{LC}$ of a liquid crystal capacitor 31 is the capacitance of a capacitor comprising the pixel electrode 11 and the common electrode 7.

In the conventional LCD having the above-described structure and operation, the gate line, the source line, the pixel electrode and the common electrode include a conductive material. Using insulation materials such as a silicon oxide or a silicon nitride, the conductive elements are electrically isolated Then a time delay problem arises due to the resistance R of the conductive material and the capacitance C of the conductive material, as shown in equation (1).

$$T_{delay} = R*C \qquad (1)$$

Particularly, a pulse signal applied to the common electrode 7 can be distorted by the time delay $T_{delay}$ arising due to a parasitic capacitance 33 (Csc) formed between the source line 15 and the common electrode 7 and the resistance of common electrode (Rc), as shown FIG. 2c.

When a scan voltage is applied to the gate line 13, a horizontal crosstalk problem occurs because of the distortion of the scan voltage driving the TFTs 17. The horizontal crosstalk causes failure in the reproduction of original picture data by the horizontally neighboring picture areas or the horizontally neighboring pixels. For example, let's assume that a picture is reproduced at the Xth row of a picture area 41 as shown in FIG. 3a At that time, a scan voltage is applied to the Xth row for selecting and turning on the Xth row. The picture data applied to the data bus line is reproduced on each picture area 41 of the Xth row. However, with the actual picture values of 0, 0, 63, 0, 0 . . . shown in FIG. 3a, the represented picture values of 0, α, 63, α, 0 . . . are present in accordance with the distortion of the waveform of the common electrode 7 as shown in FIG. 3b. In the conventional LCD, image quality deteriorates in the horizontal direction.

Reducing the parasitic capacitance (Csc) or the resistance of the common electrode (Rc) in equation (1) may correct the horizontal crosstalk problem. In the first case where the parasitic capacitance Csc is reduced to correct the horizontal crosstalks, parasitic capacitance Csc is determined using the dielectric constant of an insulation material covering the source line and the width of the source line. These values vary in accordance with the selection of an insulation material. By selecting an insulation material which reduces parasitic capacitance, it is possible to correct partially the horizontal crosstalk problem. However, there is a limitation in selecting a proper insulation material.

Instead, the present invention suggests a solution of reforming the structure of a color filter panel. To do so, the conventional method for manufacturing a conventional color filter panel is first investigated. FIG. 4 shows a plan view of a conventional color filter panel and FIGS. 5a–5e show cross-sectional views, taken along the cut line V—V, explaining a conventional method of manufacturing the color filter panel of FIG. 4.

As shown in FIG. 5a, an opaque metal such as chromium is deposited on a transparent glass substrate 1a. The deposited opaque metal is patterned to form a black matrix 5 (FIG. 4) between the pixels in a grid patter The black matrix 5 is composed of a plurality of horizontal black matrix strips 5b and vertical black matrix strips 5a. The vertical and horizontal black matrix strips 5a and 5b are disposed at positions corresponding to the gate and source lines. The width of each of the black matrix strips 5a and 5b is greater than the width of the gate and source lines. The vertical black matrix strip 5a is formed corresponding to the position of the source line, and the horizontal black matrix strip 5b is formed corresponding to the position of the gate line.

As shown in FIG. 5b, a resin having a color among red, green and blue is selectively coated over the substrate Ia and the black matrix strips 5a and 5b. For example, a red resin is coated and patterned to form a plurality of red color filters 3R arranged with a predetermined space therebetween. Next, as shown in FIG. 5c, a green resin is coated and patterned to form a plurality of green color filters 3G arraying near the red color filters 3R. Finally, a blue resin is coated and patterned to form a plurality of blue color filters 3B arraying between the green color filters 3G and the red color filters 3R. In the step of forming such color filters, certain portions of the vertical black matrix strips 5a are exposed between the color filters 3R, 3G and 3B. As shown in FIG. 5d, however, the horizontal black matrix strips 5b formed along the gate lines are completely covered by the color filters.

As shown in FIG. 5e, indium tin oxide (ITO) is deposited on the color filters is 3R, 3G and 3B to form a common electrode 7. In this case, the brightness rate (aperture ratio) is reduced and power consumption of the LCD increases, because the width of the vertical black matrix strips is greater than that of the corresponding source line. The wider the width of the vertical black matrix strip is the lower the aperture ratio becomes. Therefore, by reducing the width of the black matrix strips, an LCD panel with a high aperture ratio can be obtained. FIGS. 6 and 7 depict a general LCD panel having black matrix strips with reduced width.

In the color filter panel of the LCD shown in FIGS. 6 and 7, the width of the horizontal and vertical black matrix strips 5a and 5b is smaller than that of the uncovered part of the source lines of the active panel. Because the width of the vertical black matrix strip 5a is small, the color filters 3R, 3G and 3B contact each other and completely cover the black matrix strips 5a and 5b. For example, as shown in FIG. 7, two of the color filters 3R, 3G and 3B completely cover the strips 5a and contact each other on the strips 5a Further, the red color filter 3R completely covers the horizontal black matrix strip 5b.

Comparing the LCD panels of FIGS. 5e and 7, in the LCD panel shown in FIG. 5e, the vertical black matrix strips 5a formed between the color filters 3R, 3G and 3B are electrically connected to the common electrode 7. The resistance of the common electrode 7 (Rc) is then lower than the resistance of the ITO ($R_{ITO}$), because the resistance Rc is connected with the resistance of the black matrix ($R_{BM}$) in parallel. ITO is used to form the common electrode. The following equation (2) depicts the relation between different resistances.

$$Rc = R_{ITO}*R_{BM}/(R_{ITO}+R_{BM}) < R_{ITO} \qquad (2)$$

According to equation (2), although crosstalks are reduced in the color filter panel of FIG. 5e, other problems still exist However, in the LCD panel shown in FIG. 7, the common electrode 7 does not directly contact the horizontal and vertical black matrix strips 5a and 5b formed on the color filters 3R, 3G and 3B. Then the resistance of the common electrode (Rc) is the same as the resistance of the ITO ($R_{ITO}$) as shown in the following equation (3).

$$Rc = R_{ITO} \qquad (3)$$

Therefore, in the LCD panel of FIG. 7, a crosstalk problem still exists due to the resistance of the ITO, and the quality of the picture produced by this LCD device is worse than the images produced by the LCD panel shown in FIG. 4.

SUMMARY OF THE INVENTION

An object of the present invention is to change the structure of a color filter panel in a high aperture ratio LCD panel so that a common electrode is electrically connected with a black matrix.

Another object of the present invention is to provide a color filter panel of an LCD device which overcomes problems encountered in the conventional LCD devices.

Another object of the present invention is to solve the crosstalk problem in the conventional high aperture ratio LCD panel.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Briefly described, the present invention is directed to a method for forming a color filter panel of a liquid crystal display device, comprising the steps of forming a black matrix array on a substrate, the black matrix array including a plurality of horizontal black matrix strips and a plurality of vertical black matrix strips; forming a plurality of color filters on the substrate, and the horizontal black matrix strips, so that portions of the horizontal black matrix strips are exposed, and forming a common electrode over the color filters.

Furthermore, the present invention is directed to a color filter panel of a liquid crystal display device, including a black matrix array formed on a substrate, the black matrix array including a plurality of horizontal black matrix strips and a plurality of vertical black matrix strips; a plurality of color filters formed on the substrate and portions of the horizontal black matrix strips; and a common electrode formed on the color filters and exposed portions of the horizontal black matrix strips.

BRIEF DESCRIPTION OF THE ATTACHED DRAWINGS

The present invention will become more fully understood from the detailed description given hereinbelow and the accompanying drawings which are given by way of illustration only, and thus are not limitative of the present invention and wherein.

Figure 1:
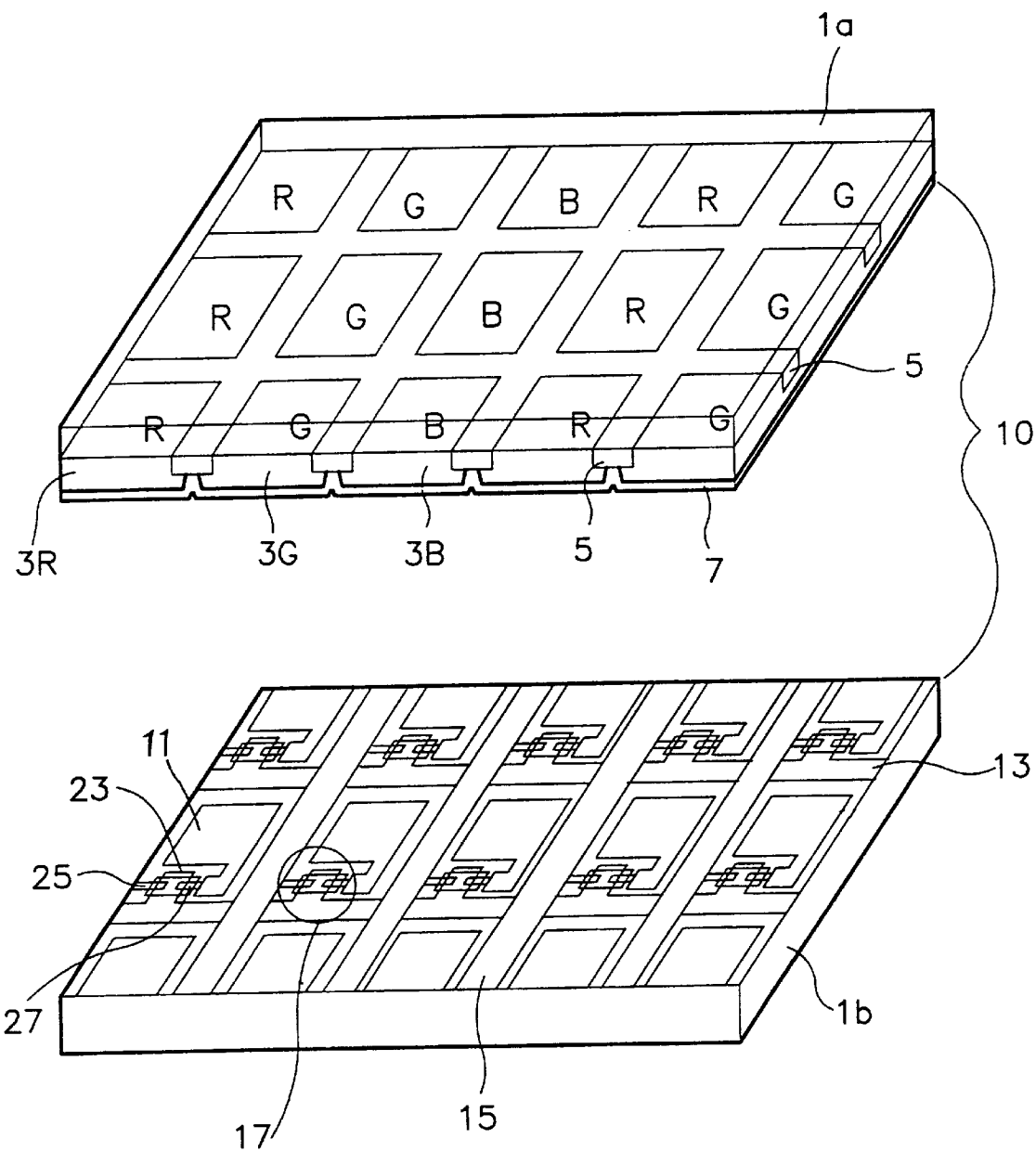
FIG. 1 is a perspective view showing the conventional structure of an LCD device.
Figure 2A:
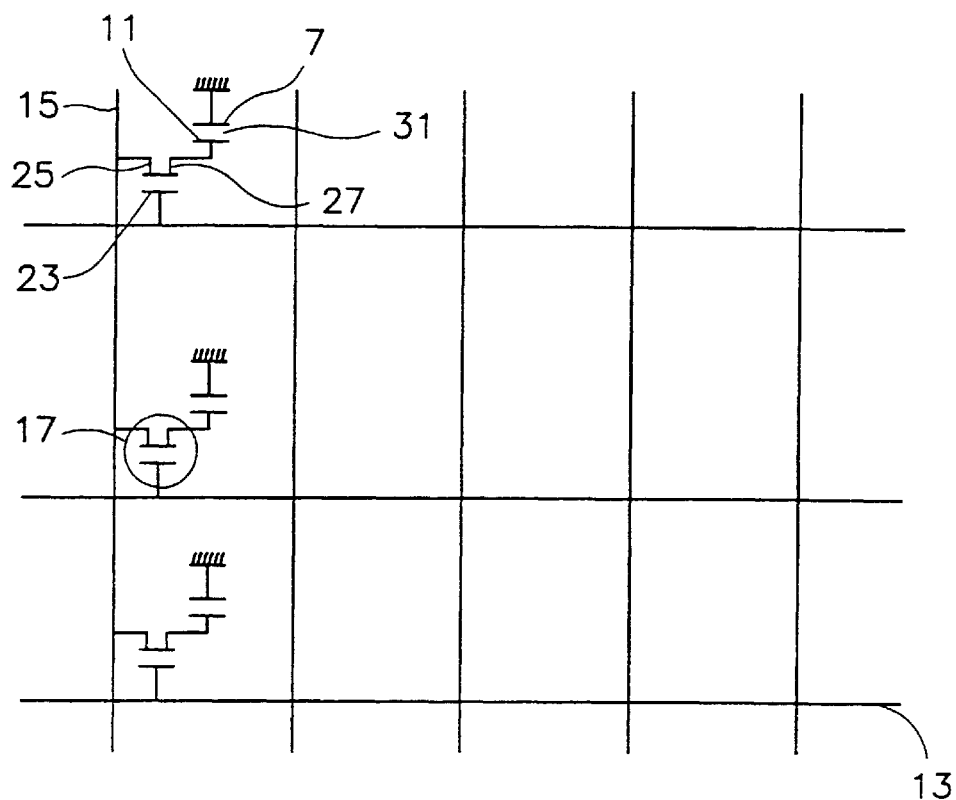
FIG. 2a is a schematic circuit diagram of a pixel part of the LCD of FIG. 1.
Figure 2B:
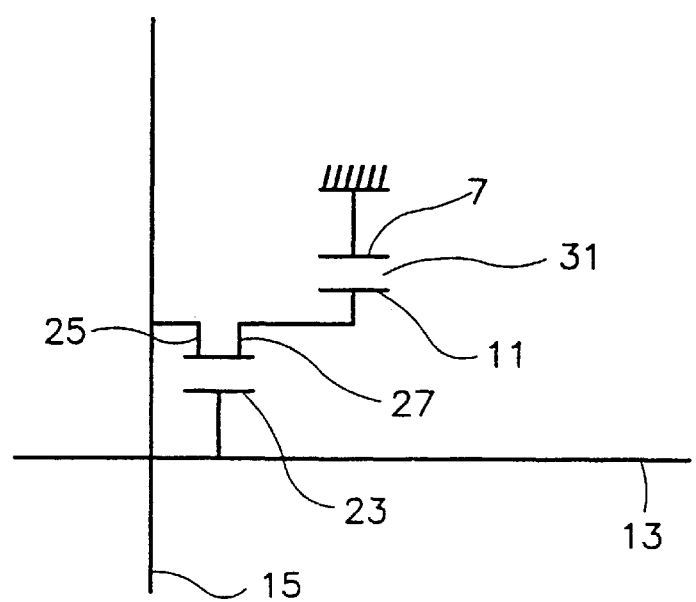
FIG. 2b is a schematic circuit diagram of a pixel part of the LCD of FIG. 1.
Figure 2C:
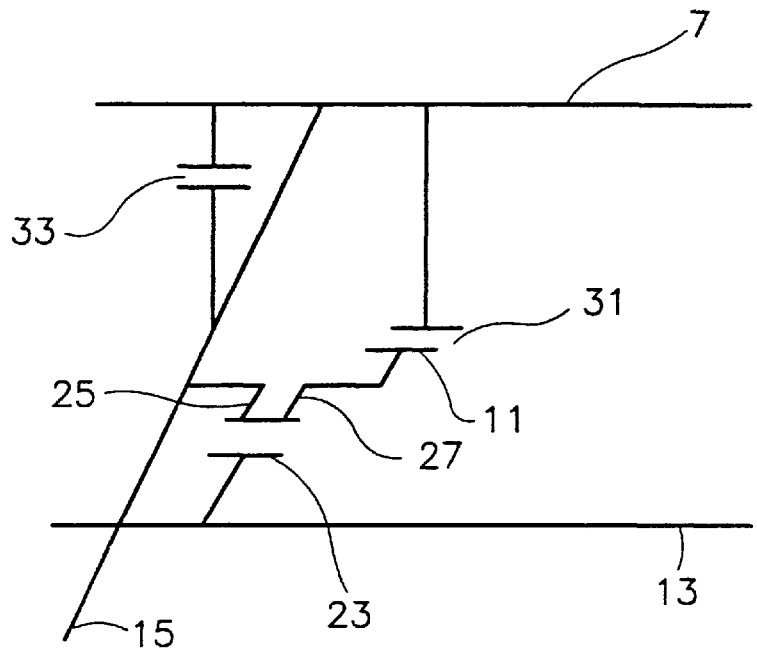
FIG. 2c is a circuit showing the parasitic capacitance between a source bus line and a common electrode in the conventional LCD.
Figure 3A:
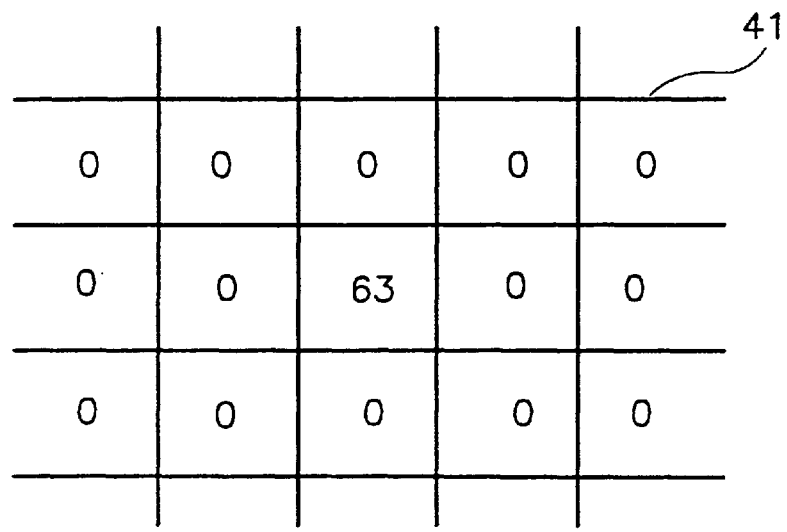
FIGS. 3a and 3b show screen situations of the conventional LCD having a crosstalk problem.
Figure 3B:
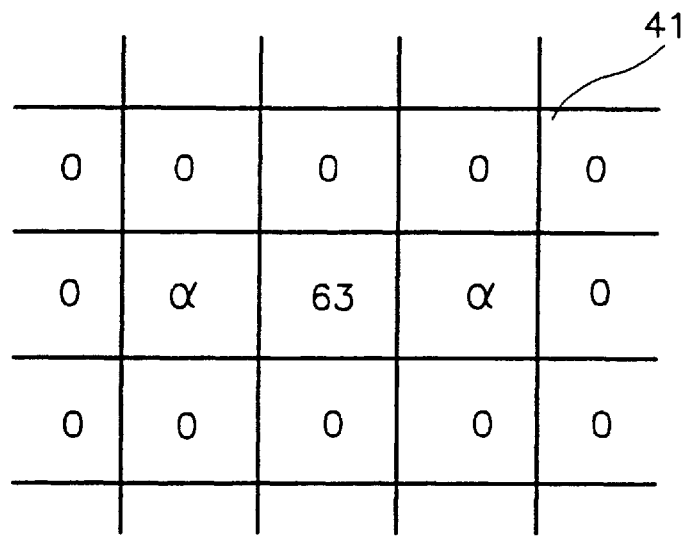
Figure 4:
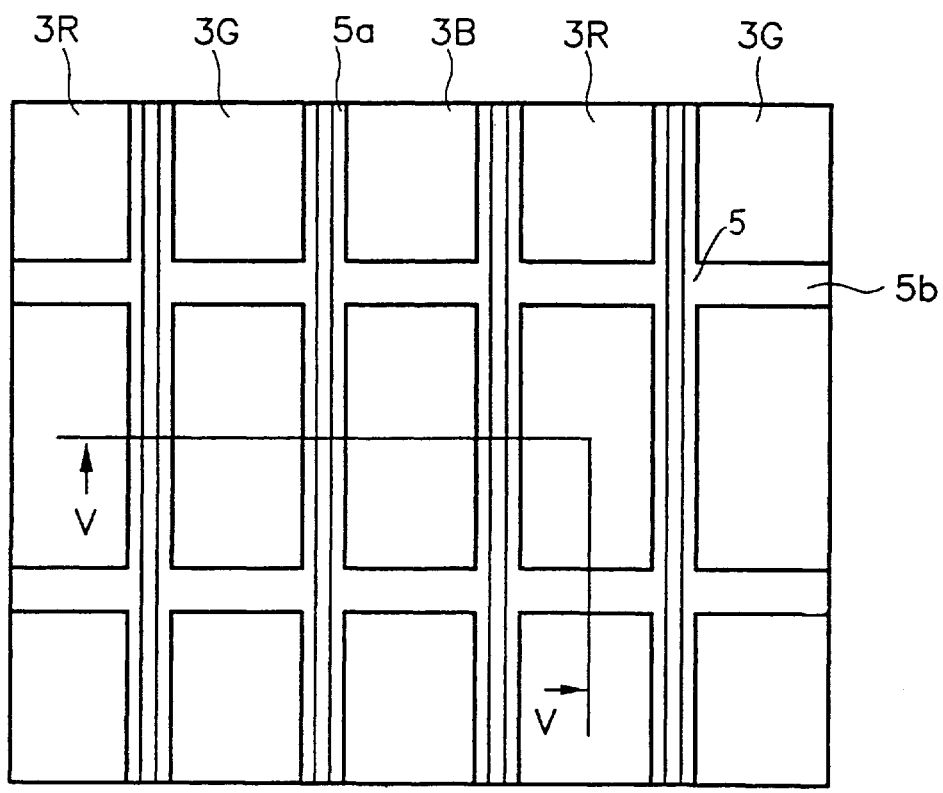
FIG. 4 shows the structure of a conventional color filter panel of an LCD.
Figure 5A:
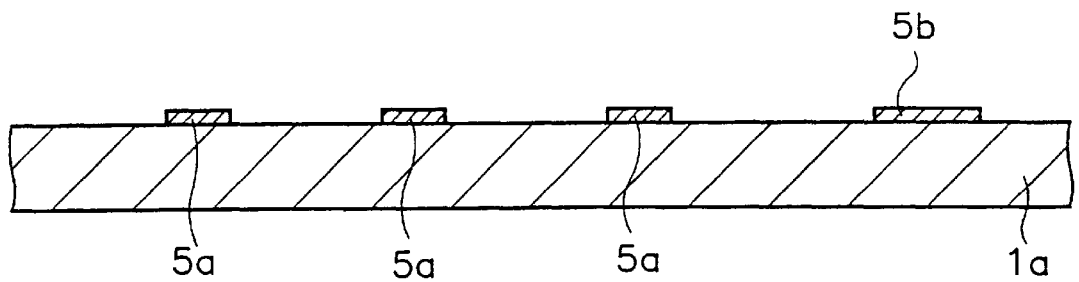
FIGS. 5a–5e are cross-sectional views showing a conventional method for manufacturing the color filter panel of FIG. 4, taken alone line V—V of FIG. 4.
Figure 5B:
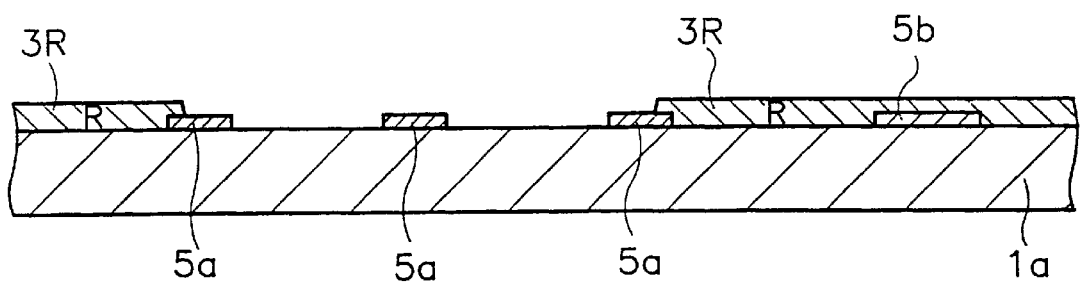
Figure 5C:
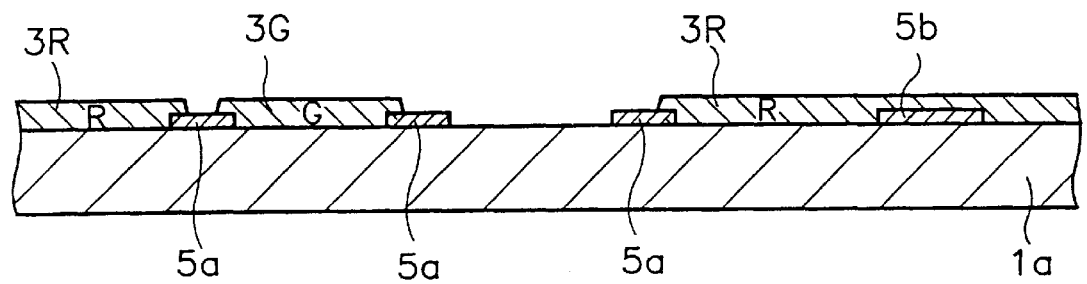
Figure 5D:
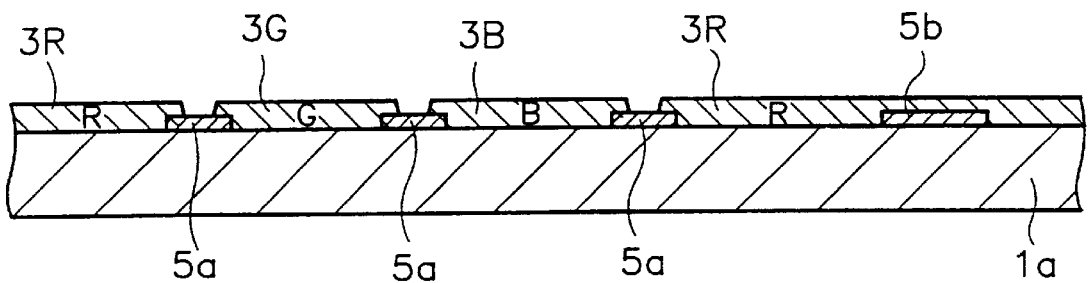
Figure 5E:
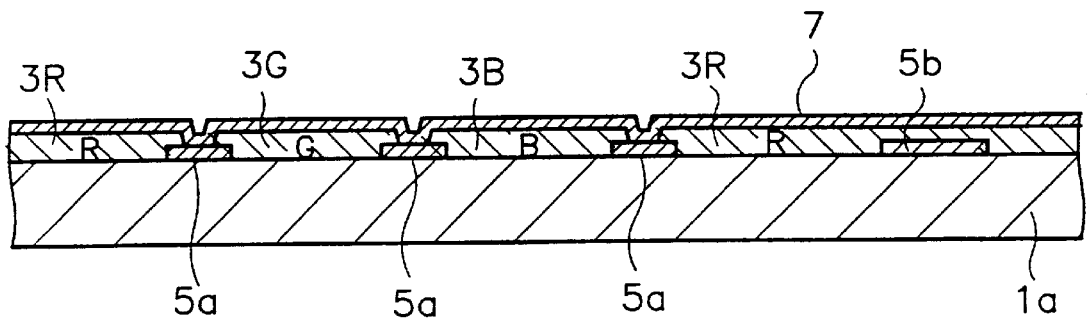
Figure 6:
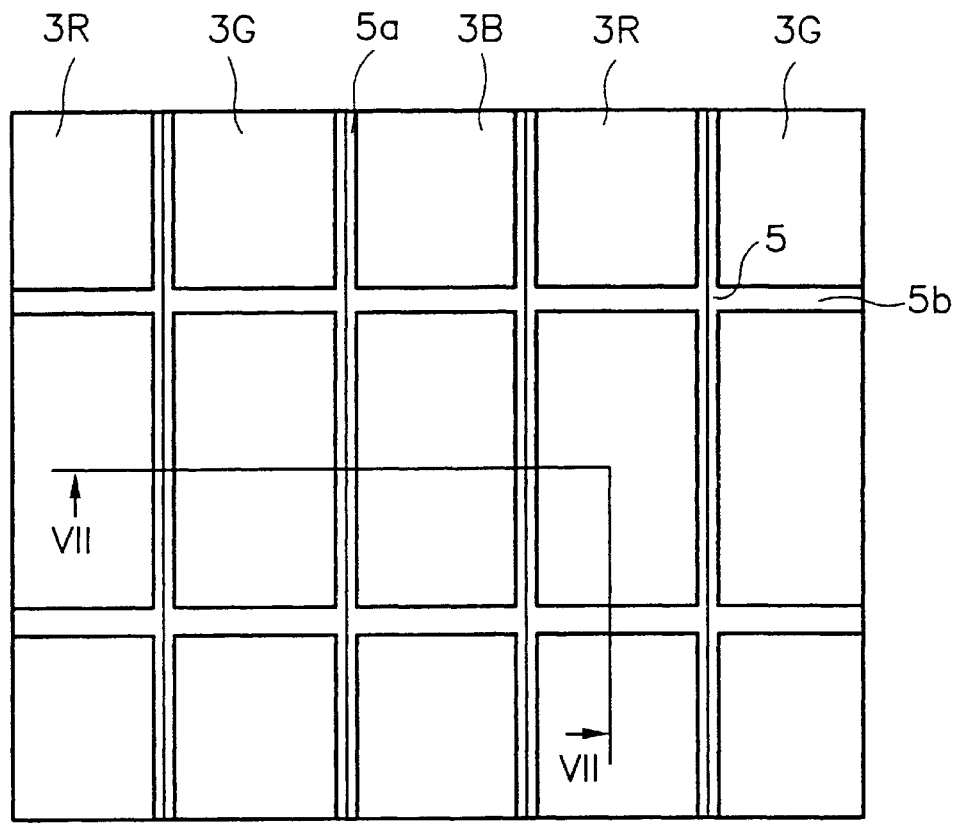
FIG. 6 is a plan view showing the conventional structure of a high aperture ratio color filter panel of an LCD.
Figure 7:
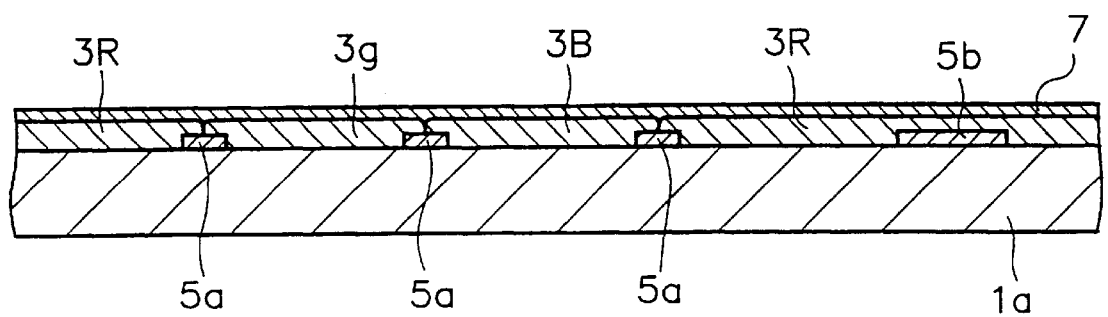
FIG. 7 is a cross-sectional view taken alone line VIII—VIII of FIG. 6.
Figure 8:
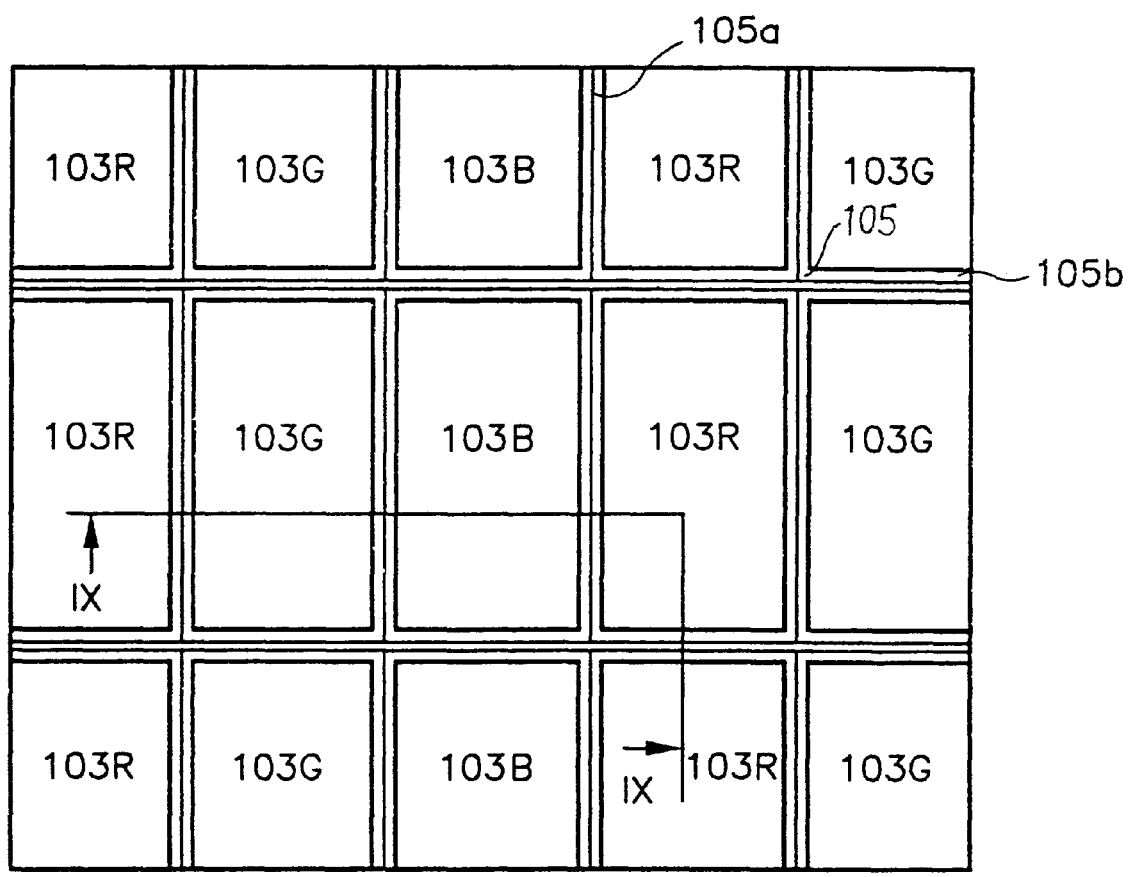
FIG. 8 is a plan view showing a structure of a high aperture ratio color filter panel of an LCD in accordance with the embodiments of the present invention.
Figure 9A:
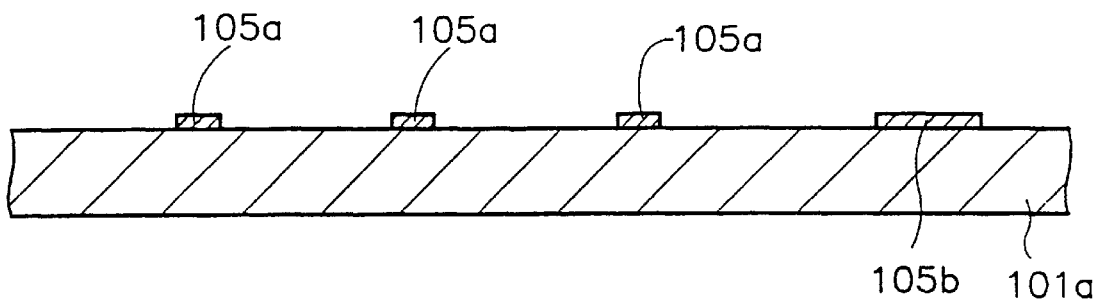
Figure 9B:
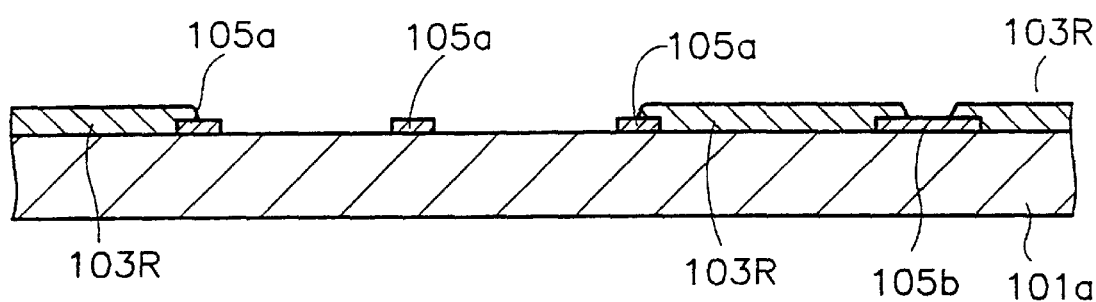
Figure 9C:
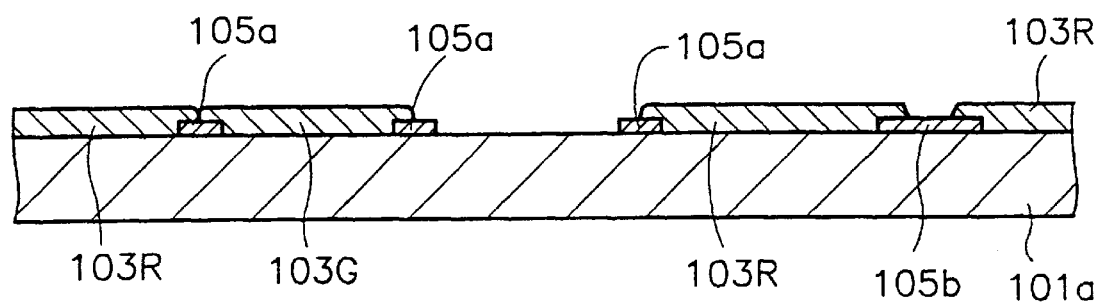
Figure 9D:
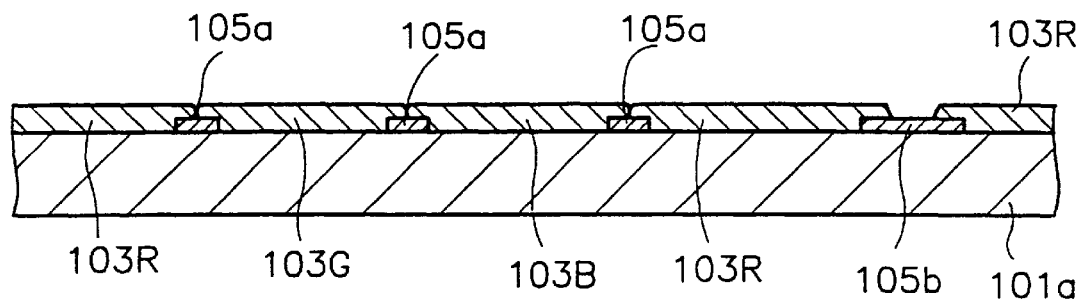
Figure 9E:
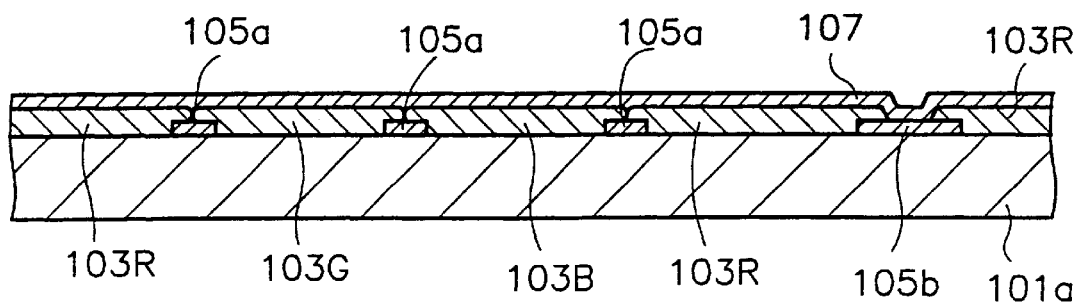
Figure 10A:
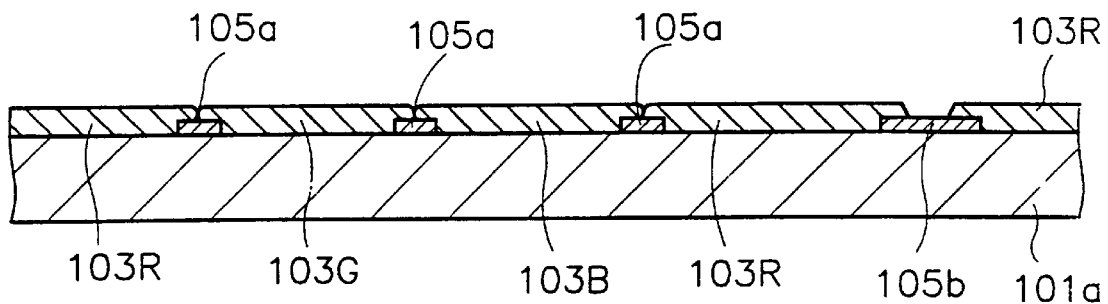
Figure 10B:
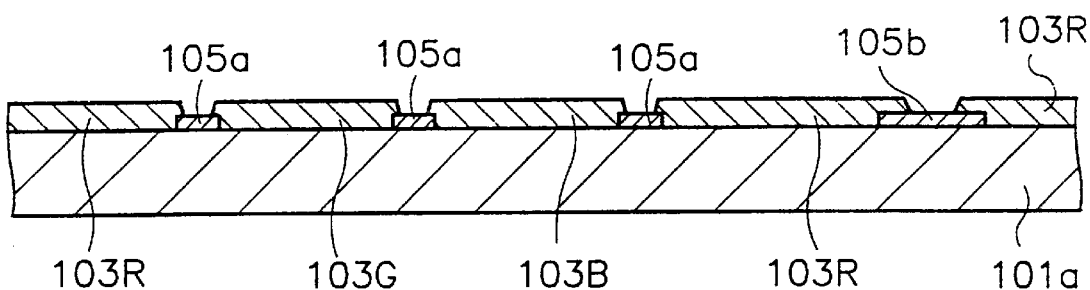
Figure 10C:
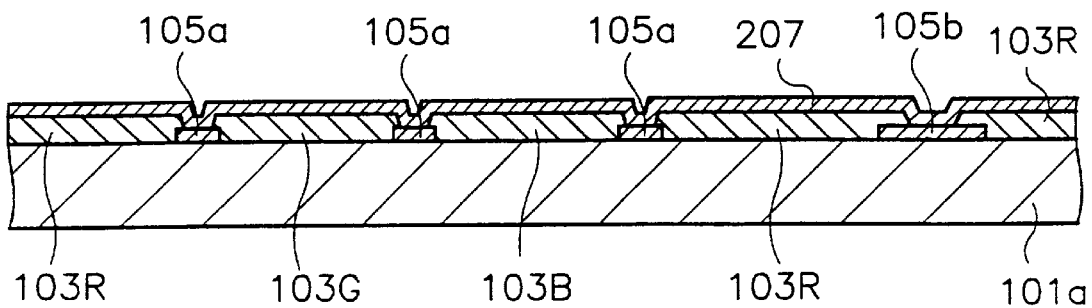

FIGS. 9a–9e are cross-sectional views, taken along line IX—IX of FIG. 8, for showing a method of manufacturing a high aperture ratio color filter panel of an LCD in accordance with a first embodiment of the present invention; and FIGS. 10a–10c are cross-sectional views, taken alone line IX—IX of FIG. 8, for showing another method of manufacturing a high aperture ratio color filter panel of an LCD in accordance with a second embodiment of the present invention.

DETAILED DESCRIPTION OF THE PREFERRED EMBODIMENTS

FIG. 8 shows a plan view of a structure of a high aperture ratio color filter panel of an LCD in accordance with the embodiments of the present invention.

FIGS. 9a–9e show cross-sectional views, taken along line IX—IX of FIG. 8, for explaining a method of manufacturing a high aperture ratio color filter panel of an LCD in accordance with a first embodiment of the present invention. Referring to FIGS. 8 and 9a–9e, the first embodiment of the present invention will be described.

As shown in FIG. 9a, an opaque metal such as chromium is deposited on a transparent insulation substrate 101a The insulation substrate 101a may be, e.g., a non-alkalic glass. The deposited opaque metal is patterned to form vertical black matrix strips 105a each having a width smaller than that of the source lines formed on another substrate (not shown). The vertical black matrix strips 105a correspond to the source lines. A plurality of horizontal black matrix strips 105b are also formed perpendicular to the vertical black matrix strips 105a, so that the vertical and horizontal black matrix strips 105a and 105b form a grid-patterned black matrix 105. The horizontal black matrix strips 105b correspond to the gate lines in the active panel.

As shown in FIG. 9b, a red resin is coated on the substrate 101a having the black matrix strips 105a and 105b, and patterned to form red color filters 103R arraying at specific locations. The red color filters 103R are formed at every third pixel area.

As shown in FIG. 9c, a green resin is coated and patterned to form green color filters 103G adjacent the red color filters 103R. The green color filters 103G are disposed to correspond to the pixel array and are formed on one side of the red color filters 103R.

As shown in FIG. 9d, a blue resin is coated and patterned to form blue color filters 103B between the green and red color filter 103G and 103R The blue color filters 103B are disposed to correspond with the pixel array between the red color filters 103R and the green color filters 103G. Although it is described here that the red, green and blue resins are applied in such order, they may be applied in different sequence.

The width of each of the vertical black matrix srips 105a is smaller than that of the conventional vertical black matrix strips. As a result, the color filters 103R, 103G and 103B overlap each other or contact each other. Each of the vertical black matrix strip 105a is completely covered by the color filters 103R, 103G and 103B. The width of each of the horizontal black matrix strips 105b formed between two same color filters is much greater than the width of the vertical black matrix strips 105a. In this embodiment, each of the color filters 103R, 103G and 103B is separately formed in accordance with each pixel shape so that top portions of the horizontal black matrix strips 105b are exposed between the same color filters, as shown in FIG. 9d.

As shown in FIG. 9e, indium tin oxide (ITO) or the like is deposited on the color filters 103R, 103B and 103G to form a common electrode 107. The common electrode 107 is electrically connected with the horizontal black matrix strips 105b disposed alone with the gate bus lines. Therefore, the resistance of the common electrode 107 (Rc) in equation (2) becomes lower than the resistance of the ITO (RITO) by the parallel connection of the common electrode 107 and the horizontal black matrix strips 105b.

According to a second embodiment of the present invention, the vertical black matrix strips are exposed by etching the edge portions of the color filters above the vertical black matrix strip. Then the vertical black matrix strips are also electrically connected with the common electrode. Referring to FIG. 8 and FIGS. 10a–10c showing the cross sectional views of a method for manufacturing the color filter panel taken along line X—X in FIG. 8, the second embodiment of the present invention is described.

As in the first embodiment, vertical and horizontal black matrix strips 105a and 105b are formed on a transparent glass substrate 105a using an opaque metal such as chromium, as shown in FIG. 10a Color filters 103R, 103G and 103B are selectively formed thereon using the red, green and blue resins.

As shown in FIG. 10b, edge portions of the neighboring color filters 103R, 103G and 103B which cover the vertical black matrix strips 105a are removed by etching. Top portions of the vertical black matrix strips 105a are then exposed The top portions of the horizontal black matrix strips 105b, as formed in FIG. 10a, are already exposed.

As shown in FIG. 10c, indium tin oxide (ITO) or the like is then deposited on the color filters 103R, 103B, and 103G and on the exposed vertical black matrix strips 105a to form a common electrode 207. The common electrode 207 is electrically connected with the horizontal black matrix strips 105b along the gate lines and with the vertical black matrix strips 105a along the source lines. Therefore, the resistance of the common electrode 207 (Rc) is lower than the resistance of the ITO ($R_{ITO}$) in equation (2), due to the parallel connection of the common electrode 207 and the black matrix strips 105a and 105b.

Accordingly, the present invention overcomes the crosstalk problem in the conventional LCD devices by decreasing the resistance of the common electrode formed in a color filter panel of a high aperture ratio LCD device. In the present invention, the black matrix includes an opaque metal and the common electrode is directly (electrically) connected with the horizontal black matrix strips, so that the resistance of the common electrode is lower than that of the opaque metal or the ITO. The horizontal black matrix strips are selectively exposed to be electrically connected with the common electrode. The resistance of the common electrode is decreased by using an opaque metal having a resistance lower than that of the ITO as the black matrix material and by connecting the common electrode with the horizontal black matrix strips. In the first embodiment, the horizontal black matrix strips are directly connected to the common electrode. In the second embodiment, both the horizontal and vertical black matrix strips are directly connected to the common electrode. The embodiments of the present invention provide a high aperture ratio LCD panel having a good picture quality without the crosstalk problems.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A liquid crystal display device comprising:

an active panel including a gate line and a source line formed on a first substrate; and a color filter panel including a black matrix array formed on a second substrate, the black matrix array having a plurality of vertical black matrix strips which are narrower in width than the source line and a plurality of horizontal black matrix strips, a plurality of color filters formed on the second substrate and on portions of the horizontal black matrix strips, the color filters contacting each other over the vertical black matrix strips and a common electrode formed on the color filters and directly on a middle portion of each of the horizontal black matrix strips.

2. The liquid crystal display device according to claim 1, wherein the common electrode is formed directly on the color filters.

3. The liquid crystal display device according to claim 2, wherein the width of each of the horizontal black matrix strips is greater than the width of each of the vertical black matrix strips.

4. The liquid crystal display device according to claim 1, wherein the plurality of color filters completely and directly cover the plurality of vertical black matrix strips.

5. The liquid crystal display device according to claim 1, wherein the common electrode is formed directly on a middle portion of each of the vertical black matrix strips.

* * * * *